(12) United States Patent  
Roosenraad et al.

(10) Patent No.: US 11,900,419 B2
(45) Date of Patent: *Feb. 13, 2024

(54) METHODS AND APPARATUS FOR CROSS PLATFORM MONITORING AND CUSTOMER TARGETING

(71) Applicant: TIME WARNER CABLE ENTERPRISES LLC, St. Louis, MO (US)

(72) Inventors: Chris Roosenraad, Vienna, VA (US); Ethan Lawrence Wolf, Aurora, CO (US); Craig Engel, Shamong, NJ (US); Justin Tidwell, Waxhaw, NC (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/015,050

(22) Filed: Sep. 8, 2020

(65) Prior Publication Data

US 2020/0402113 A1 Dec. 24, 2020

Related U.S. Application Data

(63) Continuation of application No. 14/513,205, filed on Oct. 13, 2014, now Pat. No. 10,769,671.

(51) Int. Cl.
*G06Q 30/02* (2023.01)
*H04L 65/61* (2022.01)
(Continued)

(52) U.S. Cl.
CPC ..... *G06Q 30/0269* (2013.01); *G06Q 30/0277* (2013.01); *H04L 65/612* (2022.05); *H04L 61/4511* (2022.05)

(58) Field of Classification Search
CPC ............ H04L 67/1023; H04L 43/0817; H04L 61/4511; H04L 67/1001; H04L 61/59;
(Continued)

(56) References Cited

U.S. PATENT DOCUMENTS 9,787,775 B1 * 10/2017 Richardson ............. H04L 67/10
2002/0087975 A1 * 7/2002 Schlack ........... H04N 21/26241
725/34

(Continued)

*Primary Examiner* — Saba Dagnew
(74) *Attorney, Agent, or Firm* — Straub & Straub; Michael P. Straub; Stephen T. Straub

(57) ABSTRACT

Methods and apparatus for detecting and correlating content consumption, e.g., viewing of programs and/or accessing websites, across platforms of different types are described. Content consumption, e.g., requests and/or streaming is monitored and recorded on a per subscriber basis for a wide variety of platforms, e.g., set boxes, IP content playback devices such as cell phones or pad devices with IP streaming support, and/or other devices. Web site access and corresponding content consumption is determined based on DNS requests thereby avoiding the need for monitoring at web site servers and allowing centralized monitoring of web site access operations in the form of DNS requests to be detected by a Web service provider who, at least in some embodiments, is also a content provider.

25 Claims, 10 Drawing Sheets

(51) Int. Cl.
*H04L 61/45* (2022.01)
*G06Q 30/0251* (2023.01)
*G06Q 30/0241* (2023.01)
*H04L 65/612* (2022.01)
*H04L 61/4511* (2022.01)

(58) Field of Classification Search
CPC .............. H04L 67/10; H04N 21/47202; H04N 21/26241
See application file for complete search history.

(56) References Cited

U.S. PATENT DOCUMENTS

| | | | |
|---|---|---|---|
| 2010/0138534 A1* | 6/2010 | Mutnuru | H04L 43/0817 709/224 |
| 2010/0226372 A1* | 9/2010 | Watanabe | H04L 67/1001 370/392 |
| 2012/0254926 A1* | 10/2012 | Takahashi | H04N 21/47202 725/98 |
| 2013/0173769 A1* | 7/2013 | Seastrom | H04L 61/4511 709/223 |
| 2015/0120909 A1* | 4/2015 | Karthikeyan | H04L 61/4511 709/224 |
| 2015/0288647 A1* | 10/2015 | Chhabra | H04L 67/1023 709/245 |
| 2016/0014125 A1* | 1/2016 | Klein | H04L 61/59 709/224 |

\* cited by examiner

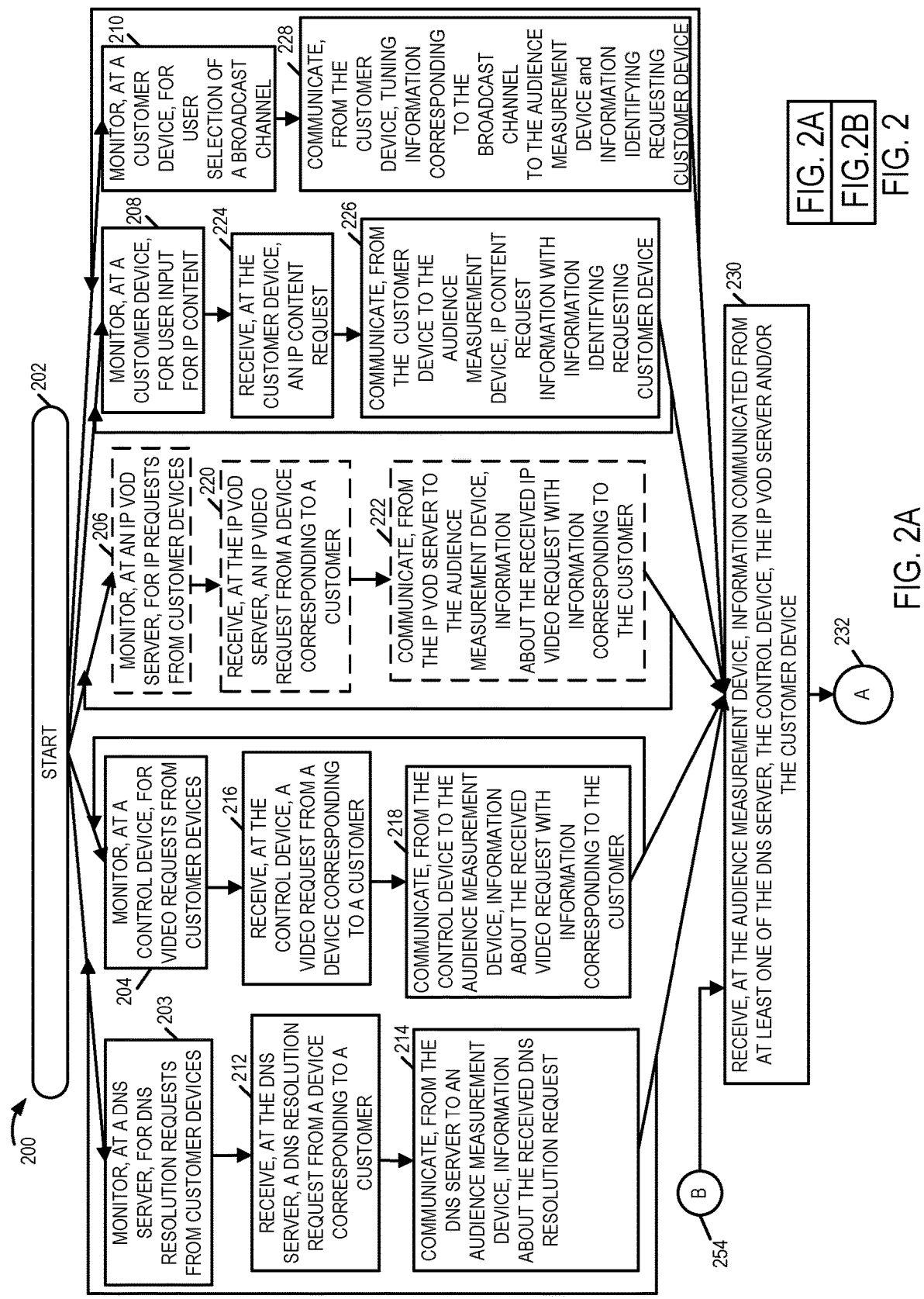

METHODS AND APPARATUS FOR CROSS PLATFORM MONITORING AND CUSTOMER TARGETING

RELATED APPLICATIONS

The present application is a continuation of U.S. patent application Ser. No. 14/513,205 filed on Oct. 13, 2014, which was published as US Patent publication US 2016-0104203 A1 on Apr. 4, 2016 and which is hereby expressly incorporated by reference in its entirety

FIELD

The present invention relates to methods and apparatus relating to the monitoring of customers who may use a plurality of different platforms to access and/or consume content and, more particularly, generating and using information relating to cross platform tracking which is useful for customer targeting and/or control of marketing programs.

BACKGROUND

Targeting of content consumers is desirable for a wide range of applications from product marketing to reaching a desired political audience for proposes of increasing public awareness with regard to a particular cause, in support of a political candidate or for other reasons.

Content consumers may now access and/or be presented with content via a wide variety of different mechanisms including broadcast programs, on demand programs such as VOD, switched digital video, the Internet, etc. The wide variety of content delivery mechanisms presents someone trying to reach a particular audience, whether that be a potential customer or political supporter, with the difficult problem of how to best allocate marketing resources between the variety of mechanisms and/or content delivery systems which may be used in an attempt to effectively reach a customer.

In order to determine the effectiveness of a marketing campaign, customer actions are often monitored on web sites. This is often referred to as monitoring of "click through" which involves detection and tracking of a customer clicking on an advertisement to visit a website or obtain information presented to the user as part of a web page or advertisement displayed along web content.

The tracking of the success of broadcast advertisements or advertisements presented via a content distribution system which does not support web pages tends to be more difficult since there is often no equivalent to a direct "click through" to be measured since in many cases a user may be presented information via a set top box or television but not have an opportunity to select a web page directly on the device used to present the advertisement. In fact, while a user may promptly seek information via the Internet on a product after being presented an advertisement, e.g., by visiting a product web side advertised on the television, the Web site hosting service generally has no way of knowing that the party contacting the web site for product information or purchase recently was presented with an advertisement for the product on a TV.

In attempting to effectively reach an audience, a marketer will often target an audience with a particular demographic, such as age, income and/or political affiliation. As part of a marketing program, after determining the target audience the marketer often allocates advertising resources to different content delivery methods in attempt to reach the targeted audience. Unfortunately, when allocating resources to different content delivery platforms the advertiser often has little knowledge as to whether advertisements are being presented to the same individuals in a geographic area multiple times via different content delivery mechanisms and/or if the advertiser is reaching the desired number of different potential customers with little overlap in the audience being reached via different advertising channels, e.g., corresponding to different content delivery mechanisms.

While inferences may be made about customers and the success of particular marketing channels, broadcast and VOD service providers are often different from the entities hosting individual web sites. For confidentiality reasons, the broadcast and/or other content providers and web site hosting service providers normally do not share detailed customer information but rather hide the individual identities of customers before sharing or exchanging customer information. This generally makes it difficult or impossible to determine with certainty whether a particular customer who visited a website was also exposed to a particular advertisement or if the same set of customers are being presented with advertisements which are repetitive.

In view of the above discussion it should be appreciated that there is a need for improved methods and apparatus for determining, with a higher degree of certainty, whether advertising is reaching the same or different potential customers via multiple communication channels and/or content delivery systems. It would be desirable if such information could be obtained and provided to marketing individuals without having to disclose the identities of the individual potential customers. It would also be possible if automated methods of reallocating resources between marketing channels could be developed which would allow for dynamic re-allocation of marketing resources between available marketing channels and/or content distribution networks based on information on the audience and/or number of distinct customers being reached as determined by monitoring of various content distribution networks and/or signaling.

SUMMARY

Various features relate to detecting and correlating content consumption, e.g., viewing of programs and/or accessing websites, across platforms of different types. Content consumption, e.g., requests and/or streaming is monitored and recorded on a per subscriber basis for a wide variety of platforms, e.g., set boxes, IP content playback devices such as cell phones or pad devices with IP streaming support, and/or other devices. Web site access and corresponding content consumption is determined based on DNS requests thereby avoiding the need for monitoring at web site servers and allowing centralized monitoring of web site access operations in the form of DNS request to be detected by a Web service provider who, at least in some embodiments, is also a content provider. In some embodiments the service provider is a cable or other service provider which provides to content via one or more content streaming platforms as well as access to Internet sites via DNS (Domain Name System) resolution operations which may be performed by one or more DNS servers.

In accordance with various embodiments, a service provider which provides access to content as well as websites, monitors a variety of content requests. The content requests may be requests to be provided access to switched digital video (SDV) content streams, video on demand (VOD) content which may be supplied via a cable network or other type of communications network such as an Internet Protocol (IP) network. Broadcast content viewing, e.g., via a Set Top Box, may also be reported via set top box reporting features implemented in some embodiments which report tuning and/or recording operations to a network headend.

In various embodiments content consumption requests and/or consumption information is detected or received in a headend and associated with a device, IP address, MAC address or other identifier which is stored in a customer, e.g., subscriber record. Detection of content requests and/or requests for content streams including switched digital streams is performed in some embodiments in a network headend, e.g., at a control device or control devices for receiving and responding to content or streaming requests.

Web access requests are detected by monitoring requests to a DNS server responsible for providing address information, e.g., IP address information, in response to name resolution requests commonly used to access a web site for which a user has a web site address, e.g., a www (world wide web) address. In this manner, web site access operations can be detected without having to directly monitor a web server or activity conducted by a user while on a web server. DNS requests include and IP address or other identifier of the device from which a DNS request is made thereby allowing the DNS request to be matched to a subscriber record based on the IP address or another identifier included in the DNS request.

By tracking DNS requests, the time they are made and correlating them to the subscriber which initiated the request by device and/or address information included in a subscriber record, Internet web site access and thus the consumption of content corresponding to one or more web sites and the time of such accesses as indicated by the time of one or more DNS requests, can be detected and reliably matched to a subscriber.

Thus content consumption information corresponding to individual subscribers is detected and correlated with time and information on the content provided to the subscriber. In this manner it is possible to detect what advertising and/or programs a subscriber was exposed to and what web sites the subscriber visited as it may relate in time to the exposure.

While the service provider collects and has access to information about individual subscribers, the information is anonymized prior to being provided to an external marketing system. The marketing system can determine from the information actual overlaps between viewers of particular advertising content supplied or incorporated into content known to have been streamed to a subscriber with actual web site visits. Thus, a marketer or other advertiser can avoid, adjust or tailor a marketing campaign to reduce or avoid undesired repetitive adds to the same individuals and can better target marketing resources to a wider audience by avoiding presenting advertisements to the same individuals via multiple streaming platforms when the desire is to reach a wider number of content consumers.

In at least some embodiments a marketing system automatically diverts or reallocates future marketing resources based on the information obtained from the cross market platform monitoring. For example, when it is determined that a large group of viewers of a particular switched digital video program are exposed to an advertisement via a streaming platform providing another different program, resources are redirected from the one of the platforms or programs to different platform or program, e.g., broadcast TV, in an attempt to reach a wider audience during the particular marketing campaign.

While various exemplary embodiments and features have been described, numerous additional features and embodiments are described in the detailed description which follows.

DETAILED DESCRIPTION

Figure 1:
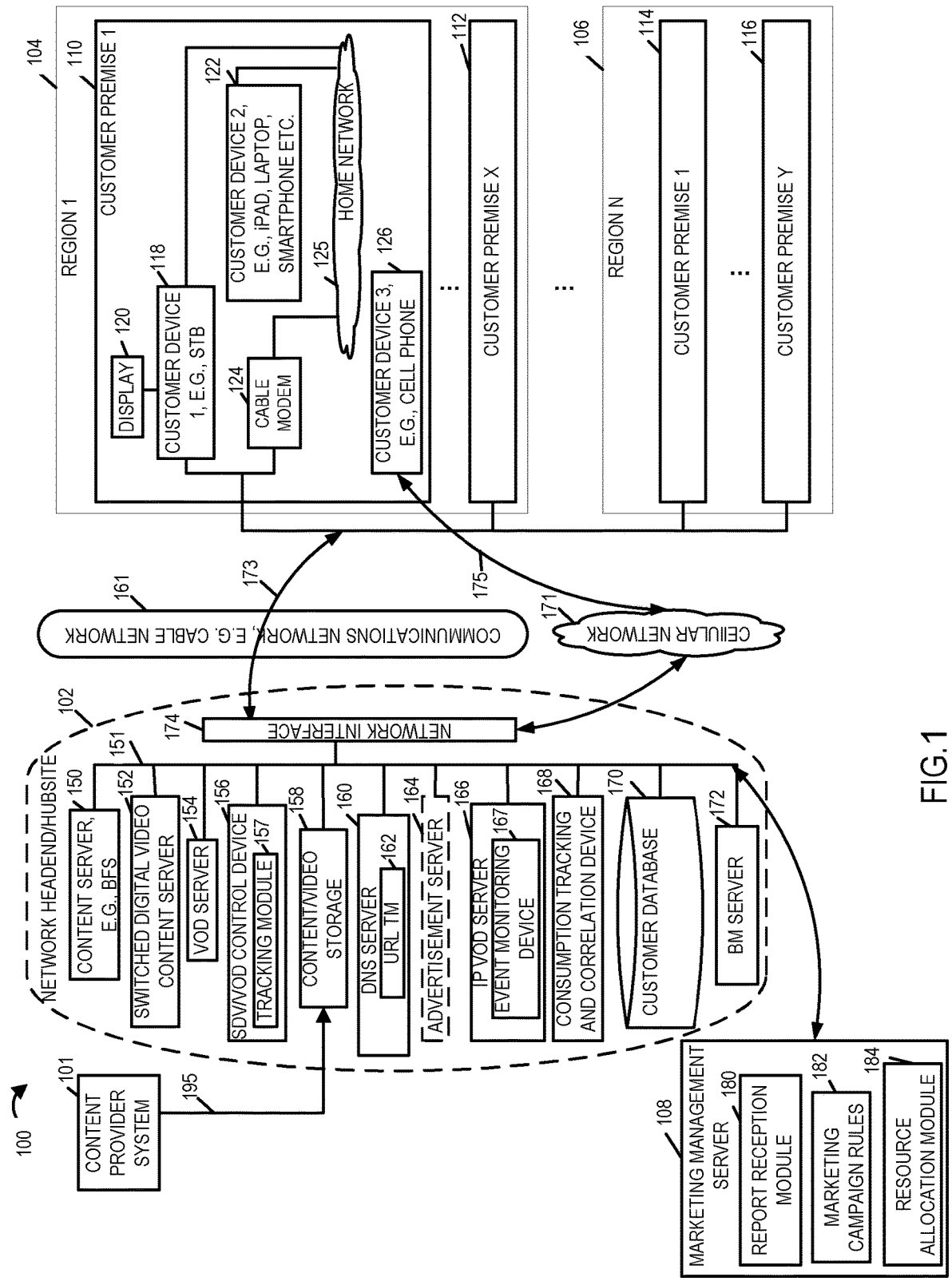
FIG. 1 illustrates an exemplary system implemented in accordance with some embodiments of the present invention.

FIG. 1 illustrates an exemplary system 100 implemented in accordance with one exemplary embodiment of the invention. System 100 supports delivery of content to customer premise equipment (CPEs), e.g., set top boxes, internet protocol (IP) capable TVs or other IP devices such as tablets, mobile phones, which may support IP content delivery of TV or other programs via an application on the device. The system 100 also supports web browsing via support for DNS lookups and Internet connectivity.

The exemplary system includes one or more subsystems which may be physically located at different locations. The one or more subsystems shown in the system 100 communicate and/or exchange information over one or more communications network, e.g., cable network, Internet etc. The various components of the system 100 will now be described. The content provider system provides video, advertisement and/or other content to the content/video storage device 158 as indicated by arrow 195.

The system 100 includes a content supplier system 101, a network headend and/or hubsite 102, a communications network 161, e.g., including a hybrid fiber-coaxial (HFC) network and/or Internet, a cellular network 171, a marketing management system 108, e.g., marketing control server, a cellular network 171 and a plurality of geographic regions 104, 106 each including a plurality of customer premises.

Each geographic region includes one or more customer premises 110, 112, 114, 116. Devices at the customer premises can receive content in a variety of ways such as via communications network 161 or wirelessly e.g., via cellular network 171. Customer premises normally include multiple devices corresponding to a subscriber. A customer record stored in a customer database 170 at the network normally identifies the subscriber devices associated with an individual customer premise 110 and/or service subscriber by the device's MAC address and/or other identification information such as an IP address used by the device.

Exemplary customer premise 110 includes a cable modem 124 though which Internet connectivity is provided to the home network 125 and devices coupled to the home network. The customer premise 110 also includes a first customer premise device 118, e.g., a set top box which is coupled to a display 120, a second customer premise device 122 such as a PC, pad device or other device with IP connectivity via the home network 125.

While a mobile device such as cell phone 126 is shown at the customer premise 110 it should be appreciated that it can be used from a wide variety of locations with content being supplied via cellular network 171 but with the device remaining associated with the account and customer record of customer premise 1 which corresponds to the subscriber who owns the cell phone 126.

As should be appreciated the various customer premise device 118, 122, 126 can be supplied with content in a variety of ways by what are sometimes referred to as "platforms" or servers. The content server which supplied content to the set top box via cable network 161 maybe and normally is different form the content server which supplied the laptop 122 or other IP based device running an IP (IP) TV application with content in response to a request. It should also be appreciated that while the laptop 122 or other customer premise device with Internet capability may access one or more Web pages this is normally done through the help of a DNS server which translates a domain name or web page URL into an IP address in response to a request from the device.

In order to support various content services including switch digital video, broadcast TV, cable network supplied VOD content, IP VOD content such as IP TV, as well as Web page access, the network headend 102 includes a plurality of devices. The exemplary headend 102 includes a broadcast file server 150, a switched digital video content server 152, a cable network Video On-Demand (VOD) server 154, a Switched Digital Video (SDV)/VOD control device 156, content video storage 158, a DNS system 160, an advertisement server 164, an IP VOD server 166, an audience measurement device 168 which also performs content consumption tracking and correlation of device to service subscriber operations, a customer database 170 and a business management server 172 coupled together via local network and/or bus 151 which also coupled the devices at the headend to network interface 174 through which the devices can communicate via the communications network 161 or cellular network 171 with devices at various locations including customer premises 110, 112, 114, 116.

The (Broadcast File System) BFS server 150 broadcasts content via cable network program channels according to a program broadcast schedule. Thus, via BFS 150 and QAM cable channel network delivery, STB 118 as well as other devices on the cable network 161 can receive a plurality of broadcast channels. In some but not all embodiments the customer premise devices 118 report tuning information to the audience measurement device 168 providing information indicating what content is being viewed at a particular point via the customer premise device 118 reporting the tuning. Thus, in at least some embodiments the audience management system is provided viewing information in the form of a STB identifier and tuning information as well as time information thereby allowing viewing via a STB of broadcast channels to be tracked and correlated to a subscriber based on the identifier, e.g., MAC address of the STB provided to the subscriber.

The switched digital video server 152 is responsible for outputting switched video channels supplied over the network 161 to one or more devices. While switched digital video is output according to a program schedule whether or not a switched digital video channel is provided to an individual customer premise or region depends on whether a request is received from a STB or other customer premise device for a particular channel. SDV/VOD control device 156 is responsible for receiving and processing requests for SDV channels and cable network supplied VOD programs. Assuming a service is authorized for a customer, the SDV/VOD control device 156 will control the VOD server to supply the content and information the STB 118 of how to tune to receive the content and/or control a switching device in the communications network to supply a requested SDV channel to the requesting STB. SDV/VOD control device 156 includes a tracking module 157 which tracks SDV and VOD requests and reports to the audience measurement device information indicating the content supplied, the time the content, e.g., program or VOD title is supplied and the duration content is supplied to a customer premise device 118.

Thus, audience management device 168 receives VOD and SDV viewing information from the control device 156 with information, e.g., a set top box or customer premise identifier, allowing the content delivery to be tracked and associated with an individual customer premise, e.g., based on a customer premise record which includes set top box and/or customer premise identifier information associated with individual service subscribers.

The headend also includes DNS server 160 which is responsible for responding to URL resolution requests, e.g., a request from a device which can access a web page for an IP address corresponding to a web page name sometimes referred to as a URL. DNS server 160 responds to URL requests by sending a response back to a requesting device such as laptop 122 corresponding to customer premise 1. In addition to responding to URL resolution requests and including circuitry for generating such requests, the DNS server 160 also includes a URL request tracking module 162 which tracks URL requests and reports to the audience management device on the URL requests received and processed. Reporting includes information identifying the web page to which a URL request corresponds, the time of the request and sufficient information to identify the requesting device, e.g., a MAC address or IP address which can be correlated to a particular subscriber and customer premise via information included in the customer database 170. In this manner, the audience management device is made aware of URL requests and thus corresponding access of a web page corresponding to the URL request by a service subscriber without the need for tracking software or participation in tracking by the web page being contacted.

By supporting a DNS looking tracking feature and providing URL resolution request information to the audience management device 168 a level of Web content access not normally available to an audience measurement device is provided allowing for correlation of not only web page access operations but also numerous other types of content viewing in a reliable fashion.

Having described the DNS and cable VOD tracking functionality, we will now turn to the IP VOD server 166 which is capable of tracking and reporting IP VOD content access operations, e.g., IP based VOD requests. The IP VOD server receives request for IP VOD content delivery from one or more devices, e.g., cell phone 126 and/or laptop 122 running an IP TV application. The VOD server 166 received an IP content delivery request and then streams the content, e.g., in a unicast IP stream, to the requesting device over the Internet, Cellular communications network or any other service which supports IP data content delivery. Event monitoring device 167 in the IP VOD server reports the content delivery requests including the time of the request, the customer device or subscriber to which the content request corresponds and information indicating the content delivered in response to the request. The customer device may be identified by IP address, MAC address or some other device identifier associated with a subscriber in a subscriber record stored in customer database 170 which can be accessed by the audience measurement device 168.

While in some embodiments the IP VOD server includes monitoring device 167 in other embodiments the IP TV or other application which initiates IP VOD requests from the playback device 122 includes a tracking device or module 167 which reports requests for IP content to the audience management module thereby placing at least some of the tracking functionality in the customer devices which then report the information via IP communications to the audience management device 168.

As can be appreciated the network headend 102 includes a plurality of monitoring devices 157, 162, 167 on different platforms or servers which report content consumption to the audience measurement module. Customer database 170 includes customer records corresponding to individual services subscribers, e.g., one per service subscriber and thus normally one per customer premise since a customer premise normally corresponds to a single service subscriber. The customer record includes information on services which are subscribed to by a customer, device identification information indicating devices corresponding to the service subscriber and also subscriber demographic information in some embodiments such as age, income level, geographic location, political affiliation, etc.

The device identification information in the customer record can include device MAC addresses, IP addresses and/or other device or customer identifiers including a telephone number of a customer premise device and/or a home network identifier, e.g., SSID of the home network 125.

The audience measurement device 168 can access the customer database 170 and records included therein and correlate requests for content and URL resolution requests indicating web page access to an individual subscriber based on the device and/or other identification information included in the customer record and reported information. The audience management module using the time information can determine the order of content consumption events for an individual subscriber and accurately correlate content viewed with web page access operations. Demographic information in the subscriber record can, and is, accessed. The audience measurement module correlates content access and generates anatomized data based on region, content accessed, order of access operations and a wide variety of other pieces of information which can be correlated and queried without disclosing the identity of individual subscribes outside the network headend or service provider network. Information from advertisement server 164 regarding advertisements provided with or as part of the consumed content can and sometimes is also reported to the audience management modules allowing for the correlation of advertisements and consumption information. Accordingly, audience management device 168 can not only track web page accesses but can correlate VOD and other content consumption with web page and other advertising channels to reliably determine the number of unique viewers being presented with a particular advertisement.

Content consumption information along with advertisement serving information is communicated form the audience measurement device 168, after anonymization of the information, to prevent identification of individual users, to the marketing management server 108. In this manner, the marketing management server 108 is provided useful demographic information along with cross platform viewing information and, optionally information about advertisements which were served as part of a VOD session. Information about advertisements known to be included in broadcast programs and/or SDV programs viewed by one or more users may also be reported with the consumption tracking information based on information stored at the headend in memory or provided by the advertisement server 164 which may insert or provide advertisements to the BFS server to be incorporated into broadcast content. The information is received and processed by the reception module 180 of the audience measurement device 168.

Accordingly in the system 100, the marketing management server receives reliable information about consumption of both program content and advertisements in a reliable way that is correlated across multiple platforms including platforms used to provide video services as well as Web based platforms which present web pages with web page access being determined from DNS requests.

While the marketing management system 108 receives a wide variety of reliable correlated information which can be used to determine the number of unique viewers being presented particular advertisements or marketing content, the identities of the individual viewers is not provided thereby protecting the privacy of individual users.

Figure 2B:
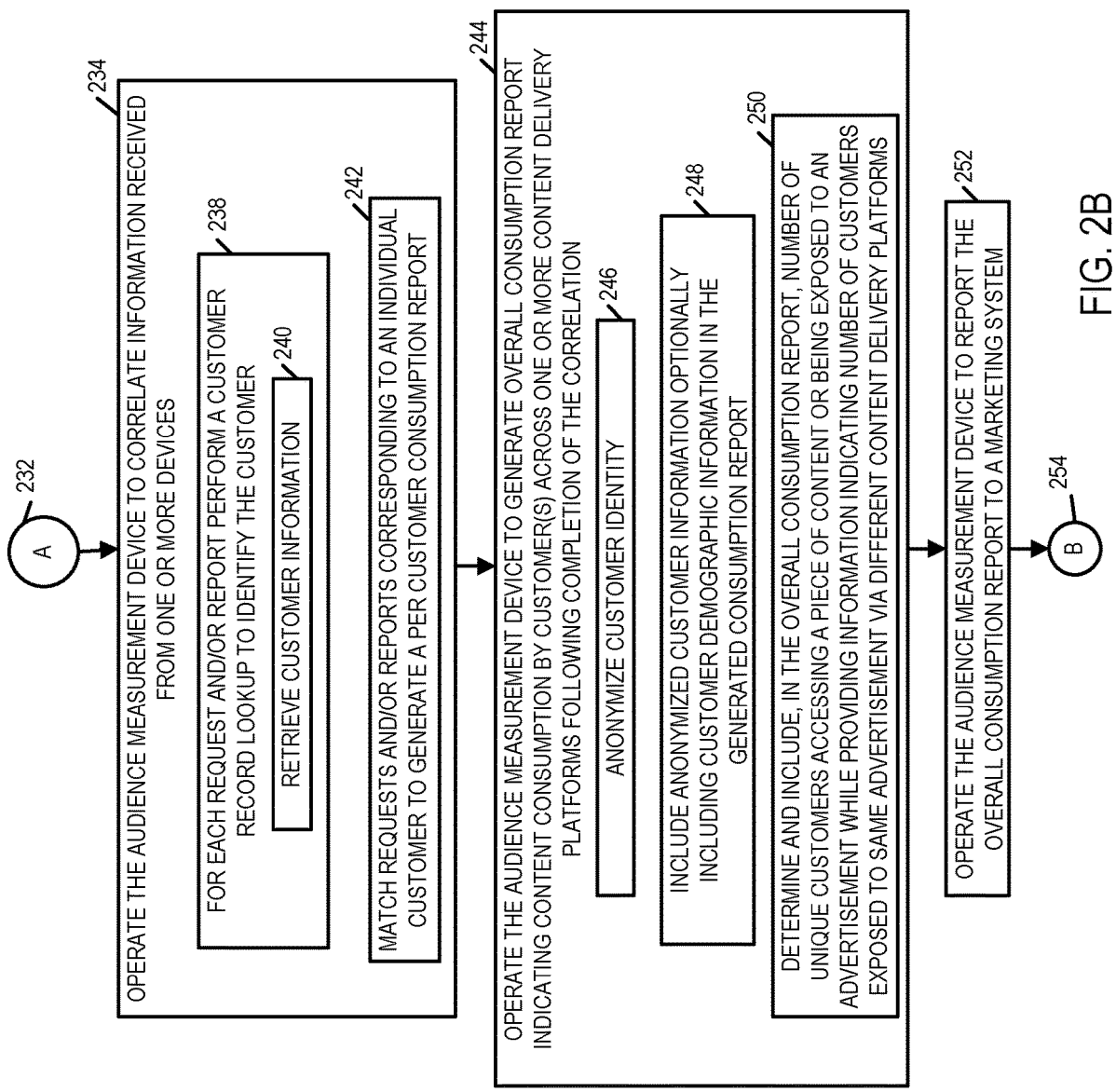
FIG. 2, which comprises a combination of FIGS. 2A and 2B, is a flowchart illustrating the steps of an exemplary method, in accordance with an exemplary embodiment implemented using the system shown in FIG. 1.

FIG. 2, which comprises a combination of FIGS. 2A and 2B, is a flowchart 200 illustrating the steps of an exemplary method implemented using the system shown in FIG. 1 in accordance with an exemplary embodiment. As discussed below the various steps of flowchart 200 are performed by one or more devices of the system 100.

Operation starts in step 202. Operation proceeds from start step 202 to steps 203, 204, 206, 208 and 210 which are performed by different devices asynchronously in some embodiments. In step 203 a DNS server monitors for DNS resolution requests from one or more customer devices. These requests are sent, e.g., when a user seeks to access a web site via a web browser. The requests normally include information indicating the url (e.g., character string identifying a web site) of the web site to be resolved and information used to return the results of the resolution request, e.g., an IP address or other identifier of a device from which the request was received or cable modem of the customer premise where the home network from which a request was received is located. Operation proceeds from step 203 to step 212. In step 212 the DNS server receives a DNS resolution request from a device corresponding to a customer, e.g., a customer device having web browsing capability. Such DNS resolution requests are received when a customer device requests a URL, e.g., via a web browser, to be resolved into an IP address. The resolution is performed by the DNS server 160 which normally returns an IP address corresponding to the URL to the requesting device in response. In accordance with one feature of some embodiments, the DNS server not only resolves the DNS requests but also tracks and stores information regarding the DNS resolution request and the requesting customer. While a DNS request does not establish actual access of the corresponding web site, given that the normal use of a DNS request is to obtain an IP address of a web site which it then automatically accessed by a web browser, the monitor of DNS requests provides a good indicator of web site access without having a monitoring device at the actual web site which may be accessed. Thus, monitoring of DNS requests at the DNS server or elsewhere provides a useful tool for monitoring web site activity without requiring consent or authorization of the web site operators and without having to actually directly interact or operate the web sites. Operation proceeds to step 214. In step 214 the DNS server communicates information about the received DNS resolution request to an audience measurement device, e.g., such as the consumption tracking and correlation device 168. The audience measurement device interprets the DNS request as corresponding to a web site access operation in at least some embodiments and is able to identify the customer premise and/or customer premise device corresponding to the request based on the information in the DNS request indicating the device from which the request was received and/or other information communicated with the DNS request. In various embodiments, it may be known that a particular web site presents advertisements corresponding to one or more marketing campaigns to users who access the web site. Thus based on the tracking of DNS resolution information it is possible to determine what web site or sites have been accessed, the time of the access which is interpreted as the time of the resolution request or the time response to the resolution request is sent. This information can and in some embodiments is correlated with user's exposure to advertisements during a monitoring interval via other content platforms and/or channels such as cable channels, broadcast channels, etc.

In some embodiments the information communicated from the DNS server 160 to the audience measurement device further includes information corresponding to the requesting customer, e.g., such as an IP address or MAC address of a cable modem corresponding to the customer/subscriber. Operation proceeds from step 214 to step 230. In various embodiments the steps 203, 212 and 214 are repeated, e.g., for additional DNS requests, as indicated by the loopback.

Returning to step 204. In step 204 a control device, e.g., SDV/VOD control device 156, monitors for video requests from one or more customer devices. Operation proceeds from step 204 to step 216 where the control device receives a video request from a device corresponding to a customer, e.g., a device capable of receiving SDV and/or VOD content from servers 152, 154. A video request indicates a request for content, e.g., movie, TV program or another multimedia content, by the requesting device. In various embodiments the control device 156 tracks and maintains information regarding the received video requests and the requesting devices and/or customers. Operation proceeds from step 216 to step 218. In step 218 the control device communicates information about the received video request with information corresponding to the customer, to the audience measurement device. Operation proceeds from step 218 to step 230. In various embodiments the steps 204, 216 and 218 are repeatedly performed, e.g., for additional video requests, as indicated by the loopback.

Returning to step 206. In step 204 an IP VOD server, e.g., server 166, monitors for IP requests from one or more customer devices. Operation proceeds from step 206 to step 220 where the IP VOD server receives an IP video request from a device corresponding to a customer, e.g., a customer device capable of receiving IP content stream, e.g., smartphone, laptop, IP set top box, iPAD and/or other tablet device etc., from an IP content source such as the IP VOD server 166. An IP video request indicates a request for an IP compliant content stream communicating requested content, e.g., movie, TV program or another multimedia content. In various embodiments the IP VOD server 166 tracks and maintains information regarding the received IP requests and the requesting devices and/or customers. Operation proceeds from step 220 to step 222. In step 222 the IP VOD server communicates information about the received IP video request with information corresponding to the customer, to the audience measurement device. Operation proceeds from step 218 to step 230. In some embodiments the steps 206, 220 and 222 are repeated, e.g., for additional IP content requests. Steps 206, 220 and 222 are optional as indicated by the dashed boxes and thus may not be performed in some embodiments. In some such embodiments the monitoring for IP content requests is performed by an IP capable customer device as discussed with regard to steps 208, 224 and 226.

Referring to step 208. In step 204 a customer device, e.g., an IP capable device, monitors for user input indicating a request for IP content. The user input may be indicative of a user selection of content available for viewing, e.g., such as selection of a TV program, movie or other content from a playlist and/or program guide. In some embodiments the IP capable customer device is one of a cell phone, smartphone, a table device and/or other IP device. Operation proceeds from step 208 to step 224 where the customer device receives an IP content request from a device corresponding to a customer, e.g., a customer device capable of receiving IP content stream. In various embodiments a customer IP device requesting IP content maintains information regarding received IP content requests. Operation proceeds from step 224 to step 226. In step 222 the customer device communicates information about the received IP content request with information identifying the customer device. Operation proceeds from step 226 to step 230.

Referring to step 210. In step 210 a customer device, e.g., a set top box capable of receiving broadcast content, monitors for user input indicating selection of a broadcast channel. Operation proceeds from step 210 to step 228. In step 228 the customer device communicates tuning information corresponding to the broadcast channel to the audience measurement device. In some embodiments the information communicated to the audience measurement device includes customer device identification information. In some embodiments the tuning information is communicated from the customer device on a periodic basis and further includes a time indicating the time of the tuning event and a duration for which the device remains tuned to the broadcast channel. In the cases where the duration information is communicated along with the tuning information, the customer device communicates the report after the tuning event. Operation proceeds from step 228 to step 230.

Returning to step 230. In step 230 the audience measurement device receives information reports communicated from at least one of the DNS server, the control device, the IP VOD server and/or customer device(s). Operation proceeds from step 230 to step 234 via connecting node A 232. Following receipt of the information report(s) from one or more devices, the audience measurement device in step 234 analyzes the received data in the reports to correlate the information received. One or more of the steps 238, 240 and 242 are performed as part of step 234 in some embodiments. In step 238 the audience measurement device performs, for each content request and/or received report corresponding to content request, a customer record lookup to identify the requesting customer. Using the device and/or customer identification information included in the received reports the audience measurement device performs a lookup in the customer database 170 to find a match in order to identify the requesting customer. In step 240 the customer information corresponding to the identified, e.g., matched customer, is retrieved from the customer database 170. Thus for each content request and/or received report the requesting customer is identified. In step 242 the audience measurement device matches requests and/or reports corresponding to an individual customer to generate a per customer consumption report. Thus in some embodiments the requests and/or received information reports are sorted out to match corresponding customers so that consumption report for each customer can be generated by the audience measurement device.

Operation proceeds from step 234 to step 244. In step 244 the audience measurement device generates an overall consumption report indicating content consumption by customer(s) across one or more content delivery platforms, e.g., broadcast delivery platform, SDV and/or VOD delivery platform, and IP delivery platform. In some embodiments the overall consumption report data/information reports corresponding to a plurality of customers are compiled together still with each individual report in the overall consumption report being associated with a corresponding customer. In various embodiments one or more of the steps 246, 248 and 250 are performed. As part of generating the consumption report, in step 246 the customer identities, corresponding to the customer's referenced in the overall consumption report, are anonymized, e.g., obscured. In step 248, anonymized customer information and optionally customer demographic information is included in the overall consumption report. In step 250, the audience measurement device, having analyzed the data received in the information reports from one or more servers and devices, determines number of unique customers accessing a piece of content or being exposed to an advertisement and number of customers exposed to same advertisement(s) via different content delivery platforms. Further in step 250 the audience measurement device includes this determined information in the overall consumption report. Thus the consumption report includes information indicating how many customers were exposed to which advertisements via one or more delivery platforms including via the internet. For example customers watching content via two different delivery platforms, e.g., broadcast and IP platform for example, may be exposed to same or different advertisements depending on what kind of marketing campaign is being run by a marketing system/advertisers. The consumption report provides information, among other data, that indicates how many customers are exposed to the same advertisements via different content delivery platforms. As will be discussed such information allows a marketing system to better reallocate advertisements and advertising resources in a manner that can result in targeting a greater number of audience.

Operation proceeds from step 244 (including steps 246, 248 and 250) to step 252. In step 252 the audience measurement device reports, e.g., communicates, the overall consumption report to a marketing system, e.g., marketing management system 108. In some embodiments individual consumption reports corresponding to individual customers may also be sent to the marketing system along with the overall consumption report or separately. Operation proceeds from step 252 back to step 232 via connecting note 254 with the loopback indicating that various steps in the operation are repeated in some embodiments.

Figure 3:
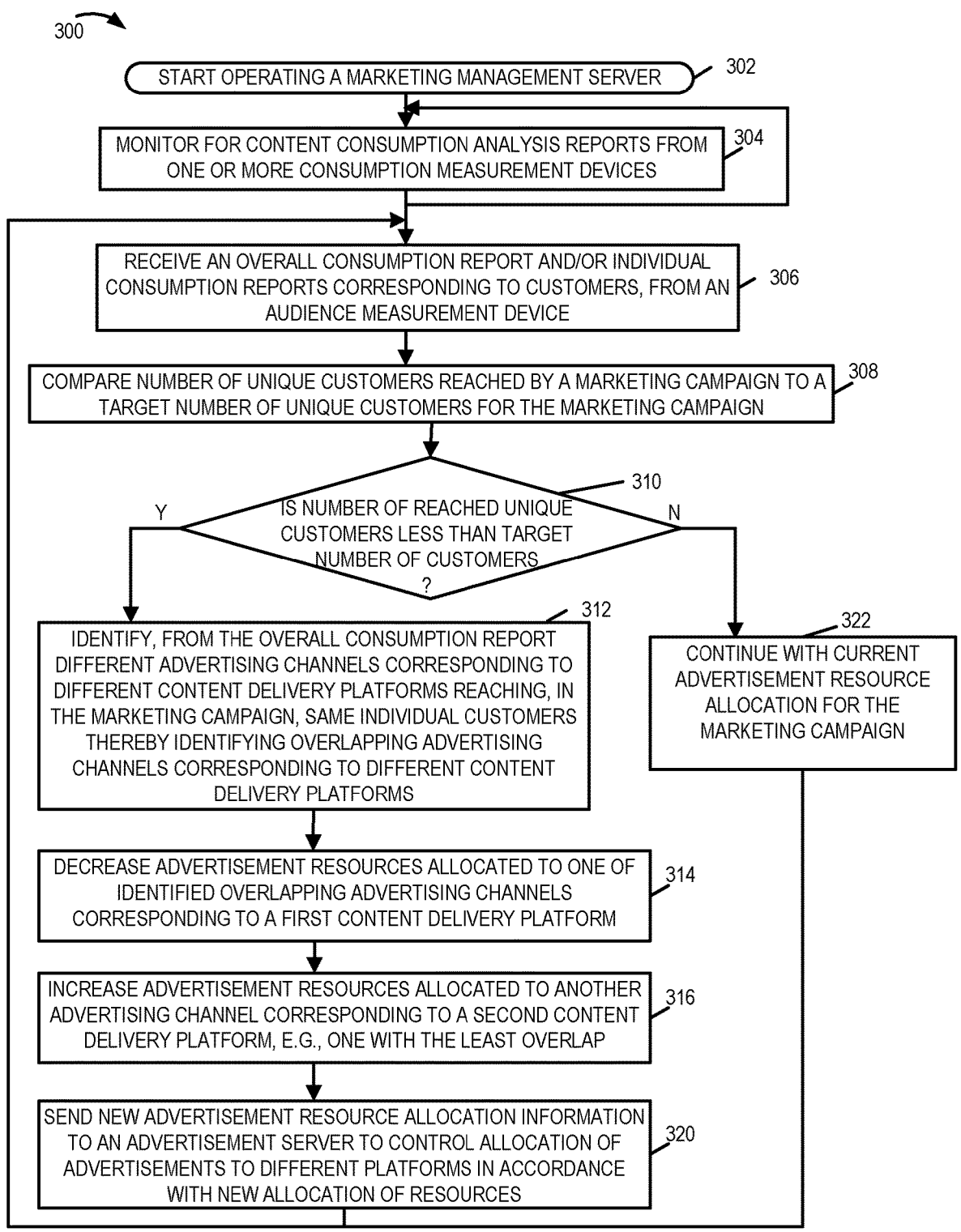
FIG. 3 is a flowchart illustrating the steps of an exemplary method of operating an exemplary audience measurement device in accordance with an exemplary embodiment.

FIG. 3 illustrates a method 300 implemented by a marketing management server 108, e.g., a hardware device or system, in accordance with one embodiment of the invention. The method starts in step 302, e.g., with the server being loaded with marketing rules and/or other information, e.g., number of unique customers to be reached, in a given marketing interval as part of a marketing campaign to be automatically controlled by the marketing server.

Operation processes from step 302 after start of the marketing campaign to step 304 in which the server monitors for content consumption information, e.g., information indicating advertisements presented to customers via different individual channels (advertising platforms) being used in the marketing campaign. The content consumption reports from the measurement devices may provide information for a single platform or channel to which the measurement device corresponds and the information may be provided with unique customer identifying information. Accordingly, information obtained in step 304 while useful in providing information corresponding to a particular marketing platform or channel may lack the detail needed to determine if customers reached via an individual channel are the same or different form the customers reached via a different channel.

Monitoring and receipt of reports from individual consumption measurement devices, may occur on an ongoing basis as represented by the arrow shown at the output of step 304 returning to the input to step 304.

Operation proceeds from step 304 to step 306 in which an overall consumption report and/or individual consumption reports corresponding to different content delivery platforms are received from the audience measurement device. Thus, the server can receive anonymized reports directly from individual monitoring devices which also provide detailed information to the secure and trusted audience measurement device and/or from the audience measurement device. The audience measurement device which is trusted with detailed client information which can uniquely identify customers receives and processes the detailed consumption reports generated by the monitoring devices, correlates information which identifies customers and generates the overall consumption report which provides information on the number of unique customers which are reached via the overall marketing campaign as well as the number of customers reached via particular communications channels. The overall consumption report may be of the type shown in FIG. 4 and may also include the information shown in FIG. 5. As will be discussed below, such information can be used to determine how to shift or reallocate resources between different marketing channels to increase the number of unique customers reached using limited marketing resources, e.g., limited number of advertisements which can be served given marketing budget constraints.

Operation proceeds form step 306 to step 308 in which the number of unique customers reached by the marketing campaign for which a report is received in step 306 is compared to the target number of unique customers which were to be reached during the interval to which the received report corresponds as part of the marketing campaign. In step 310 a check is made to determine if the marketing goals are being satisfied or if a change in the allocation of marketing resources should be made. If in step 310 it is determined that the number of unique customers reached is not less than the target number of customers, i.e., the marketing objectives in terms of unique customers to be reached is being satisfied, operation proceeds to step 322 in which the marketing campaign is continued with the current advertisement resource allocation for the marketing campaign being left unchanged. Operation proceeds from step 322 back to step 306 to indicate that the receipt and check of marketing campaign success may be repeated for subsequent monitoring intervals.

If in step 301 it is determined that the marketing objectives are not being meet, e.g., the number of unique customers being reached is below the target number operation proceeds from step 310 to steps 312. In step 312 different advertising channels corresponding to different content delivery platforms reaching, in the marketing campaign, same individual customers, are identified from the overall consumption report. This allows identification of overlapping advertising channels corresponding to different content delivery platforms.

Operation proceeds from step 312 to step 314. In step 314 the marketing management server decreases the advertisement resources allocated to one of the identified overlapping channels corresponding to a first content delivery platform.

Operation proceeds from step 314 to step 316. In step 316 the marketing management server increases the advertisement resources allocated to another advertising channel corresponding to a second content delivery platform, e.g., an advertising channel with the least overlap, for better utilization of advertisement resources.

Operation proceeds from step 316 to step 320. In step 320 the marketing management server sends new advertisement resource allocation information to an advertisement server to control allocation of advertisements to different platforms in accordance with new allocation of advertisement resources. Operation proceeds from step 320 back to step 306 to indicate that the process may be repeated for subsequent monitoring intervals.

Figure 4:
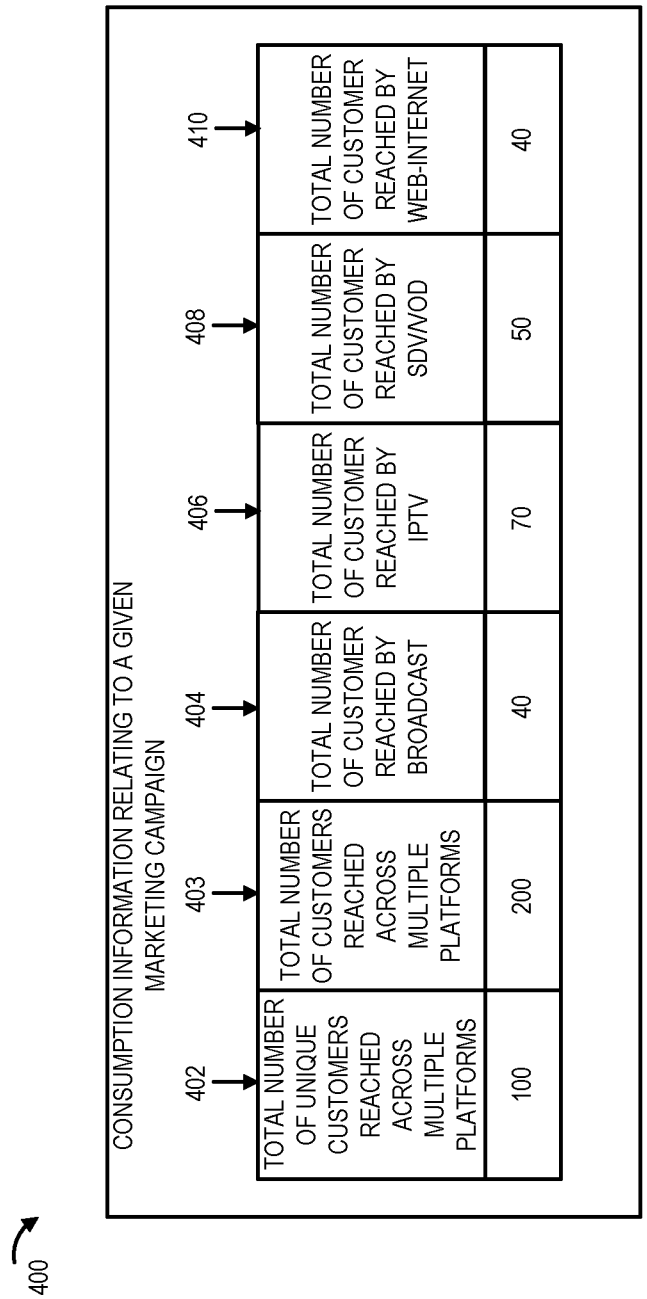
FIG. 4 illustrates a set of exemplary consumption information relating to an exemplary marketing campaign showing the number of users reached during a monitoring interval via different advertising channels corresponding to different platforms, e.g., corresponding to different communications technologies and/or channels, and the total number of unique customer reached via the multiple platforms and channels.

FIG. 4 illustrates advertisement consumption information 400 that can be generated based on the cross platform/delivery network advertisement exposure information that can be obtained by combining the information from the various monitoring and reporting devices including the DNS request monitoring device.

The information 400 is shown for a single monitoring time period for a single cross platform marketing campaign. However, it should be appreciated that the same or similar information can be generated for multiple different marketing campaigns and/or for different monitoring time intervals.

As shown in FIG. 4, the advertising content consumption information 400 which indicates information about the number of individuals reached, e.g., to which advertisements corresponding to the marketing campaign were presented, as part of the cross platform marketing campaign during the monitoring interval to which the data 400 corresponds.

In the first column the total number 402 of unique customers reached across multiple platforms as part of the marketing campaign is shown. Unlike other system where reliable information is not available, in the current system individual customers can be reliably tracked across the Internet as well as other content delivery platforms such as VOD, cable TV, broadcast TV, etc. thereby providing useful information which can be used to automatically control allocation of marketing resources, e.g., ad placements and/or ad placement resources, to reach the desired combination of unique customers, e.g., individuals or households.

Note that the total number of customers reached 403 across multiple platforms may be greater than the number of unique customers reached 402 since the same customer may be reached via different advertising platforms. Counts 404, 406, 408, 410 indicate the number of customers reached during the monitoring interval as part of the campaign being monitored. Note that the information shows 40 customers reached by broadcast, e.g., broadcast TV, 70 reached by IPTV, 50 reached by SDV or VOD and 40 reached by Web sites as indicated as discussed above by detected DNS resolution requests. Note that the total comes to 200 but column 1 makes it clear that only 100 unique customers were reached. The information shown in FIG. 4 may be, and in some embodiments is supplied to the marketing management server 108 which then processes the information and adjusts allocation of advertisements between the available communications platforms/channels to reach the desired number of unique customers. Adjustments may be made based on marketing campaign rules 182 with resource allocation module 184 of the marketing management server 108 shifting advertisements to increase or decrease the number of advertisements communicated via particular platforms to achieve the desired marketing goals and thereby optimize use of the limited amount of resources, e.g., ad purchasing ability, between the different marketing platforms. The marketing goals may be to reach a particular number of unique customers and/or to maximize the number of unique customers reached across multiple advertising platforms given a limited amount of ad purchasing power, e.g., money, available for the marketing campaign.

In some embodiment the resource allocation module 184 adjusts which platforms and/or channels are to be used during a future time period based on the information shown in FIG. 4 and communicates the new advertising information to the advertisement server 164 which controls serving of ads to the different platforms/channels as part of the marketing campaign. In this manner an advertising campaign can be automatically adjusted with changes in advertising resource allocations being based on reliable unique customer exposure information which is provided to the marketing management server 108 in an anonymous form with the identities of individuals being identified to the marketing management server.

Figure 5:
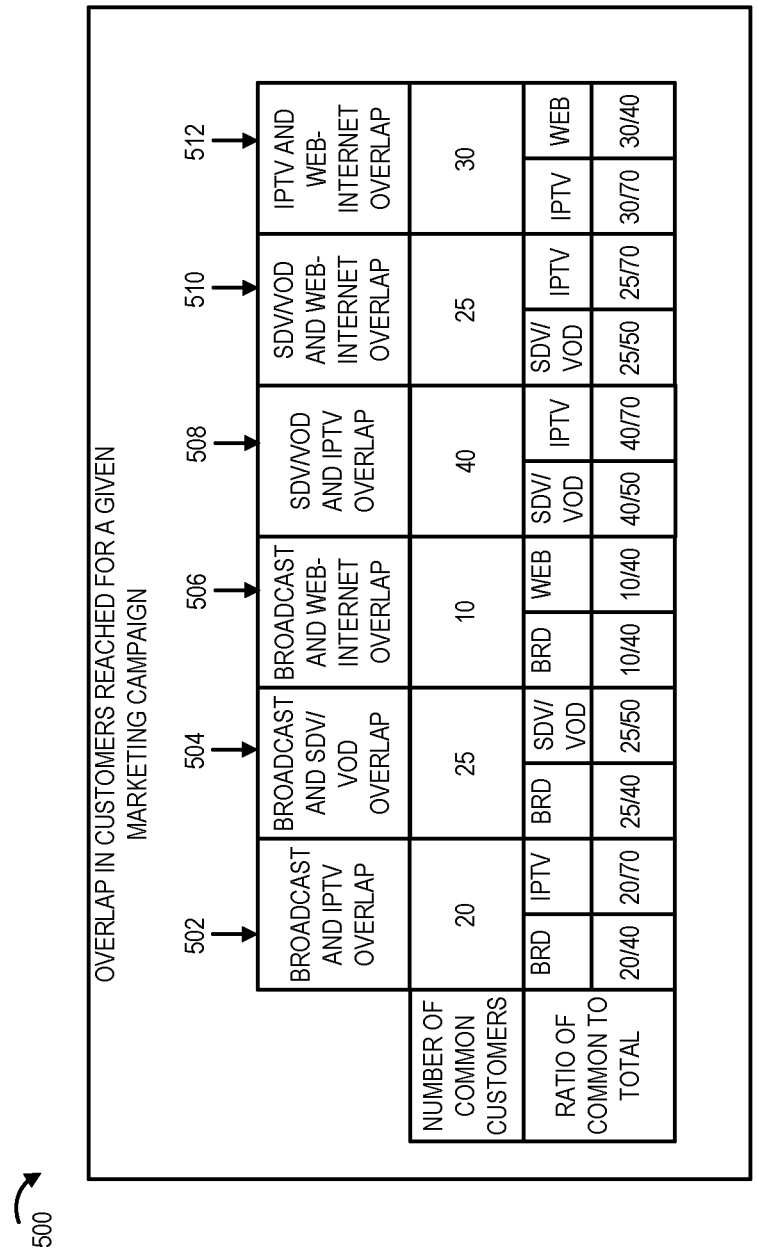
FIG. 5 illustrates information relating to overlap in customers reached via different marketing platforms which is generated in various embodiments and used as the basis for automatic adjustment of marketing resources to achieve goals in terms of the number of unique customers reached.

FIG. 5 includes a chart 500 providing information on the different content delivery platforms also sometime referred to as advertising channels, the number of customers reached by the channels and the overlap in customers reached by the channels. The content delivery channels are paired so that it is possible to see the ratio of common customers reached via a pair of channels and to make changes to increase the number of unique customers which can be reached. Column 502 includes information on Broadcast and IPTV overlap. It shows that 20 customers were common to both the Broadcast TV and IPTV delivery platforms meaning that 20 customers were reached via both channels as part of the advertising campaign during the interval that the FIG. 5 data corresponds to. In the FIG. 5 example it assumes that 40 users were reached via the broadcast channel (BRD) and 70 users were reached via the IPTV. Since 20 of the users were common, it can be seen that only half of the customers on the broadcast channel were common to the IPTV channel and half were unique. With regard to the IPTV channel 70 customers were reached and only 20 were common. Thus the IPTV channel has a 2/7 common customer ratio reflecting that 5/7 of the customers reached on the IPTV channel are not reached on the broadcast TV channel. It should be appreciated that by shifting resources from the broadcast (BRD) advertising platform to the IPTV platform a larger number of unique users can be reached for each ad which is served. This information is used by the marketing server when making decisions to shift resources between channels, e.g., from the broadcast channel to the IPTV channel to increase the number of unique users reached for a given number of advertisements presented.

Column 504 includes information on Broadcast and SDV/VOD customer overlap which is similar to the information explained with regard to column 502.

Column 506 includes information on Broadcast TV and WEB advertising customer overlap. Column 508 includes information on SDV/VOD and IPTV customer overlap. Column 510 includes information on SDV/VOD and WEB Internet customer overlap while column 512 includes information on IPTV and WEB advertising overlap in terms of customers which are reached.

As should be appreciated reliable information of the type shown in FIG. 5 which is made available to the marketing server 108 by the consumption tracking and correlation device 168 is generally not available due to tracking limitations of known systems where reliable correlation of customers and their exposure to advertisements across multiple platforms is generally not available or possible due to the data provided by individual system being scrubbed to eliminate information which can be used to identify individuals in a reliable or detailed manner.

Figure 6:
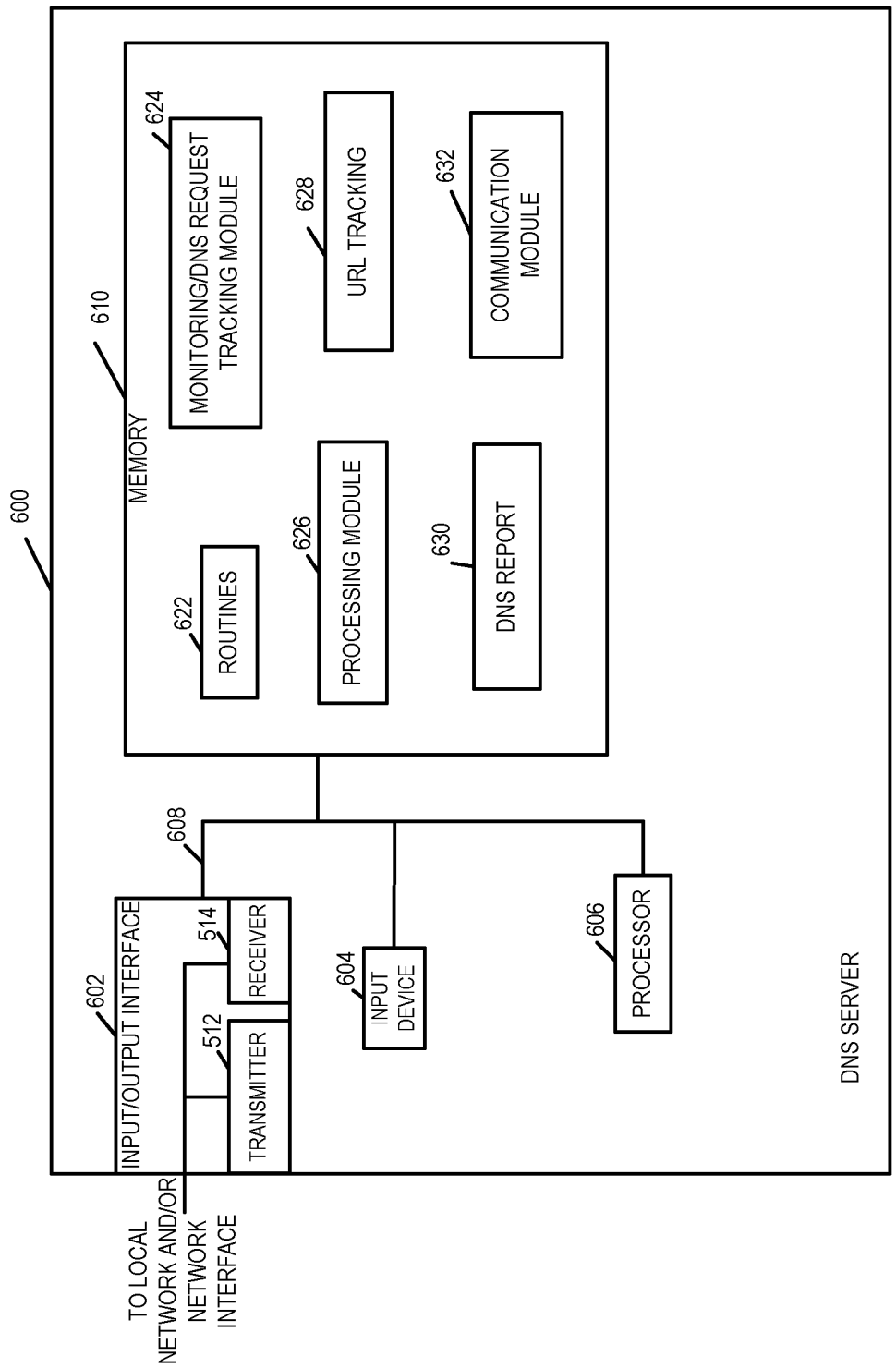
FIG. 6 illustrates an exemplary DNS server implemented in accordance with an exemplary embodiment.

FIG. 6 illustrates an exemplary DNS server 600 implemented in accordance with an exemplary embodiment. The exemplary DNS server 600 can be, and in some embodiments is, used as the DNS server 160 shown in FIG. 1. In some embodiments the DNS server 600 is configured to implement at least some of the steps of the method of flowchart 200. In accordance with one aspect of some embodiments the exemplary DNS server 600 is configured to detect DNS requests from one or more customer devices requesting domain name resolution. In some embodiments the DNS server 600 monitors for DNS requests from various customer devices serviced by the headend/hubsite 102 and responds to such requests.

As shown, the DNS server 600 includes an input/output (I/O) interface 602, an input device 604, a processor 606, and a memory 610 coupled together via a bus 608. The various elements of the DNS server 600 can exchange data and information over the bus 608.

The I/O interface 602 includes a transmitter 612 and a receiver 614. In some embodiments via the I/O interface 602 the DNS server 600 is coupled to the network interface 174 of the headend 102 via which information is communicated with the devices located at the customer premises over communications network 161. Furthermore via the I/O interface 602, the DNS server 400 can exchange signals and/or information with other devices and/or system elements such as the servers in the network headend 102 over the local network 151 of system 100.

The input device 604 may be a keypad, touch screen, and/or other device for receiving and processing input commands/instructions. The processor 606, e.g., a CPU, executes control routines 622 and in some embodiments one or more modules to control the control server 600 to operate in accordance with the invention and implement one or more steps of the method of flowchart 200. Thus to control the operation of DNS server 600, the processor 606 uses information, various modules and/or routines including instructions stored in memory 610.

In addition to the routines 622, the memory 610 includes a monitoring module 624, a processing module 626, a URL tracking module 628, and stored DNS report 630.

Routines 622 include communications routines and/or device control routines. The monitoring/DNS request tracking module 624 is configured to monitor for DNS requests and/or signals from devices, e.g., customer premise devices located at customer premises as well as other devices at the headend or located externally. Thus one or more DNS requests maybe detected by the tracking module 624 while monitoring and further actions are taken by the DNS server 600 to respond to the requests. The processing module 624 is configured to receive and process the DNS requests when DNS requests are received by the DNS server 600, e.g., via the interface 602. In various embodiments the processing module 624 processes a received DNS request and determines the customer and/or device identification information from the received request, e.g., customer ID and/or device ID.

The URL tracking module 628 is configured to track a URL or identification information corresponding to a website indicated in a DNS request from a requesting device and generate a log including DNS information and identification information corresponding to customer or customer device or customer premise. For example when a DNS request is detected from a first customer and the requesting customer and/or device is identified, the URL tracking module 628 generates an information log (or updates if the log already exist) that includes requesting customer and/or customer premise and/or device identification information and the URL or website identification information (e.g., domain or IP address). Such a log generated by the DNS server is stored in the memory as DNS report 632 and may include multiple records with each record including customer/device identification information, URL/website identification information, time DNS request was received by the DNS server, etc. In some embodiments the generated DNS report 630 is communicated to the consumption tracking and correlation device 168 or another device, e.g., periodically, or based on a predetermined schedule or upon request from the consumption tracking and correlation device 168. In various embodiments the communications module 632 controls communication of DNS report and/or other information from the DNS server 600, e.g., via the interface 602, to the audience measurement device 168 or another device. In some embodiments the customer identification information is anonymized prior to communicating the DNS report to another device.

Figure 7:
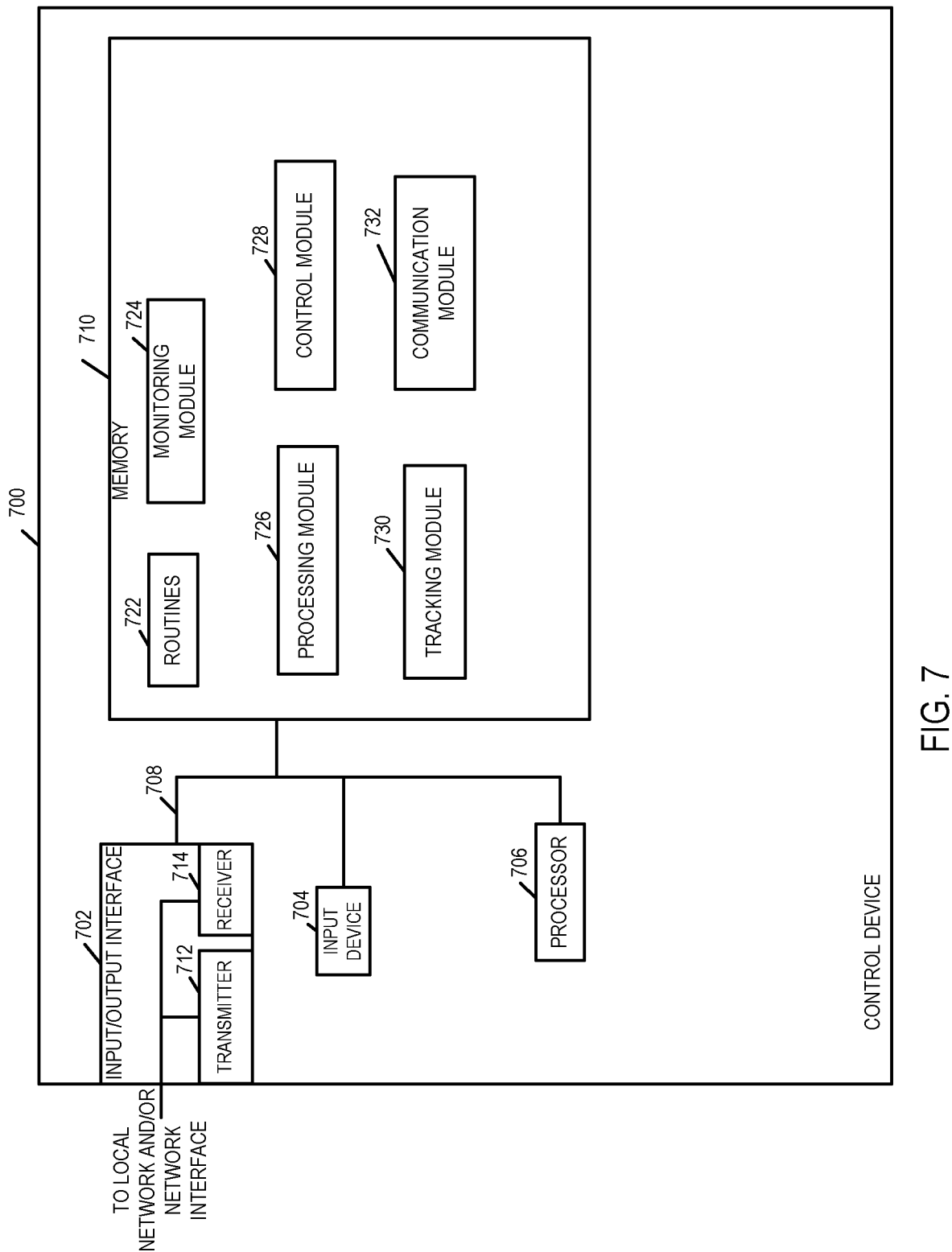
FIG. 7 illustrates an exemplary control server implemented in accordance with an exemplary embodiment.

FIG. 7 illustrates an exemplary control server 700 implemented in accordance with an exemplary embodiment. The exemplary control server 700 can be, and in some embodiments is, used as the control device 156 shown in FIG. 1. In some embodiments the control server 700 is configured to implement at least some of the steps of the method of flowchart 200. In accordance with one aspect of some embodiments the exemplary control server 700 is configured to receive and process requests for SDV channels and cable network supplied VOD programs, from one or more customer devices.

As shown, the control server 700 includes an input/output (I/O) interface 702, an input device 704, a processor 706, and a memory 710 coupled together via a bus 708. The various elements of the control server 700 can exchange data and information over the bus 708.

The I/O interface 702 includes a transmitter 712 and a receiver 714. In some embodiments via the I/O interface 702 the control server 700 is coupled to the network interface 174 of the headend 102 via which information is communicated with the devices located at the customer premises over communications network 161. Furthermore via the I/O interface 702, the control server 700 can exchange signals and/or information with other devices and/or system elements such as the servers in the network headend 102 over the local network 151 of system 100.

The input device 704 may be a keypad, touch screen, and/or other device for receiving and processing input commands/instructions. The processor 706, e.g., a CPU, executes control routines 722 and in some embodiments one or more modules to control the control server 700 to operate in accordance with the invention and implement one or more steps of the method of flowchart 200. Thus to control the operation of control server 700, the processor 706 uses information, various modules and/or routines including instructions stored in memory 710.

In addition to the routines 722, the memory 710 includes a monitoring module 724, a processing module 726.

Routines 722 include communications routines and/or device control routines. The monitoring module 724 is configured to monitor for video requests and/or signals from devices, e.g., customer premise devices located at customer premises as well as other devices at the headend or located externally. The video requests maybe requests for SDV channels and cable network supplied VOD programs. In various embodiments the monitoring module 724 detects a first video request from a device corresponding to a customer. The processing module 726 is configured to process the video requests received by the control device 700, e.g., via the interface 702. In various embodiments the processing module 726 processes a received video request and identifies the customer or customer premise or the device sending the request.

Assuming that service is authorized for a customer sending the video request, the control module 728 provides control information to the VOD server 154 (e.g., when on-demand content is requested) allowing VOD server 154 to supply the content to the requesting customer device and/or provides information, e.g., SDV parameters, of how to tune to receive the content and/or control a switching device in the communications network to supply a requested SDV channel to the requesting customer device. The tracking module 730 is configured to track the received video requests, e.g., SDV and VOD requests, and report to the consumption tracking and correlation device (audience measurement device) 168 information indicating the content supplied, the time the content, e.g., program or VOD title is supplied and the duration content is supplied to a customer premise device. Thus the control device 700 in various embodiments supplies VOD and SDV viewing information and identification information, e.g., customer device or customer premise identifier, allowing the content delivery to be tracked and associated with an individual customer premise, e.g., based on a customer premise record which includes device and/or customer premise identifier information associated with individual service subscribers. In some embodiments the information communicated to the consumption tracking and correlation device 168 is sent, e.g., periodically, or based on a predetermined schedule or upon request from the consumption tracking and correlation device 168. In various embodiments the communications module 732 controls communication of information from the control device 700, e.g., via the interface 702, to the audience measurement device 168 or another device. In some embodiments the identification information corresponding to the customer (e.g., customer ID, customer premise ID or device ID) is anonymized prior to communicating the information to the consumption tracking and correlation device 168.

Figure 8:
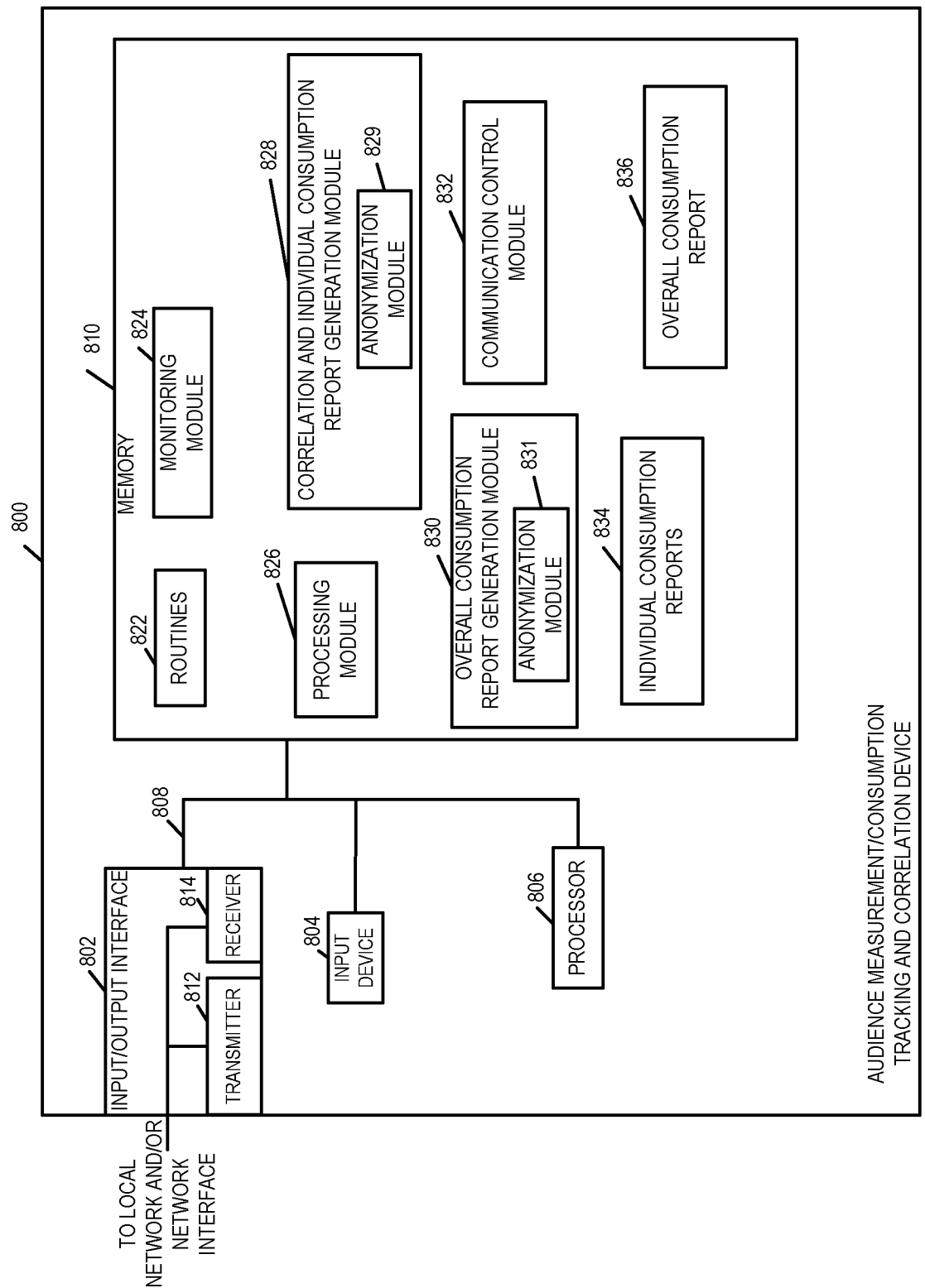
FIG. 8 illustrates an exemplary consumption tracking and correlation device implemented in accordance with an exemplary embodiment.

FIG. 8 illustrates an exemplary consumption tracking and correlation device 800 also referred to as audience measurement device implemented in accordance with an exemplary embodiment. The exemplary audience measurement device 800 can be, and in some embodiments is, used as the tracking device 168 of FIG. 1. In some embodiments the audience measurement device 800 is configured to implement at least some of the steps of the method of flowchart 200. In accordance with one aspect of some embodiments the exemplary audience measurement device 800 is configured to receive and process information from at least one of a DNS server, a control device (e.g., SDV/VOD control device) an IP VOD server and/or a customer device and generate one or more consumption reports in accordance with the invention.

As shown, the audience measurement device 800 includes an input/output (I/O) interface 802, an input device 804, a processor 806, and a memory 810 coupled together via a bus 808. The various elements of the audience measurement device 800 can exchange data and information over the bus 808.

The I/O interface 802 includes a transmitter 812 and a receiver 814. In some embodiments via the I/O interface 802 the audience measurement device 800 is coupled to the network interface 174 of the headend 102 via which information may be communicated with the devices located at the customer premises over communications network 161. Furthermore via the I/O interface 802, the audience measurement device 800 can exchange signals and/or information with other devices and/or system elements such as the servers in the network headend 102 over the local network 151 of system 100.

The input device 804 may be a keypad, touch screen, and/or other device for receiving and processing input commands/instructions. The processor 806, e.g., a CPU, executes control routines 822 and in some embodiments one or more modules to control the audience measurement device 800 to operate in accordance with the invention and implement one or more steps of the method of flowchart 200. Thus to control the operation of audience measurement device 800, the processor 806 uses information, various modules and/or routines including instructions stored in memory 810.

In addition to the routines 822, the memory 810 includes a monitoring module 824, a processing module 826, a correlation and individual consumption report generation module 828, an overall consumption report generation module 830, a communications control module 832, individual consumption reports 834 and overall consumption report 836.

Routines 822 include communications routines and/or device control routines. The monitoring module 824 is configured to monitor for information and/or signals from devices, e.g., various servers which send tracking information to the audience measurement devices, and or other devices at the headend or located externally. The audience measurement device 800 receives information from various devices via the interface 802. The received information includes information reports from one or more devices, e.g., DNS server, SDV/VOD control device, IP VOD server and/or customer device. In some embodiments the audience measurement device 800 receives DNS request information from a DNS server (e.g., DNS server 160), the information including information about a first DNS request, said information including an identifier corresponding to a first customer and information indicating a URL included in the first DNS request. In some embodiments the audience measurement device 800 further receives video information about a first video request, the first video request being a request for content from a second device corresponding to a second customer to a control device (e.g., control device 156).

The processing module 826 is configured to process the information reports received from the one or more devices as discussed in step 230. In various embodiments the processed information is passed on to other modules for action, e.g., to consumption report generation modules.

The correlation and individual consumption report generation module 828 is configured to analyze the data in the received information reports to correlate the received data. In some embodiments the module 828 is configured to perform the operations corresponding to steps 234, 238, 240 and 242 of flowchart 200. Thus, as part of the analysis, the module 828 is configured to perform, for each content request and/or received report corresponding to content request (or tuning activity in case of a customer device tuning to a broadcast channel in response to a user selection of the broadcast channel), a customer record lookup to identify the requesting customer. Using the device and/or customer identification information included in the received reports the module 828 performs a lookup in the customer database 170 to find a match in order to identify the requesting customer. In step 240 the customer information corresponding to the identified, e.g., matched customer, is retrieved from the customer database 170. Module 828 is further configured to match requests and/or reports corresponding to an individual customer to generate a per customer consumption report. Thus module 828 is configured to generate individual consumption reports for various customers consuming content. In some embodiments the customer information in the individual consumption reports is anonymized by the anonymization module 829 included in the module 828. The individual reports generated by module 828 are stored as individual consumption reports 834.

The overall consumption report generation module 830 is configured to generate an overall consumption report indicating content consumption by customer(s) across one or more content delivery platforms, e.g., broadcast delivery platform, SDV and/or VOD delivery platform, IP delivery platform etc. In some embodiments the overall consumption report includes consumption data/information reports corresponding to a plurality of customers compiled together with each individual report in the overall consumption report being associated with a corresponding customer. In some embodiments the overall consumption report generation module 830 is configured to implement one or all of the steps 244, 246, 248 and 250 as part of generating the overall consumption report. Thus as part of generating the overall consumption report the module 830 anonymizes, e.g., obscures, the customer identities corresponding to the customer's referenced in the overall consumption report, using the anonymization module 831. Furthermore as part of generating the overall consumption report the module 830 includes, in the overall consumption report being generated, anonymized customer information and optionally customer demographic information. The module 830 in some embodiments is further configured to determine number of unique customers accessing a piece of content or being exposed to an advertisement and number of customers exposed to same advertisement(s) via different content delivery platforms. In some embodiments the overall consumption report the module 830 is further configured to include this determined information in the overall consumption report. Thus in some embodiments the overall consumption report includes information indicating how many customers were exposed to which advertisements via one or more delivery platforms including via the internet. The output of the overall consumption report the module 830 is the generated overall consumption report 836 which is stored in the memory. The overall consumption report 836 may include information of the type shown in FIG. 4 and may also include the information shown in FIG. 5. Thus in some embodiments the overall consumption report the module 830 generates information relating to a given marketing campaign such as that shown in FIGS. 4 and 5.

The communications control module 832 controls audience measurement device's communications with other devices in accordance with the invention and is responsive to requests for consumption report(s) from other devices. The communications control module 832 controls communication, e.g., via interface 802, of individual consumption reports and/or the overall consumption report to a marketing system, e.g., marketing management system 108, or another device.

Figure 9:
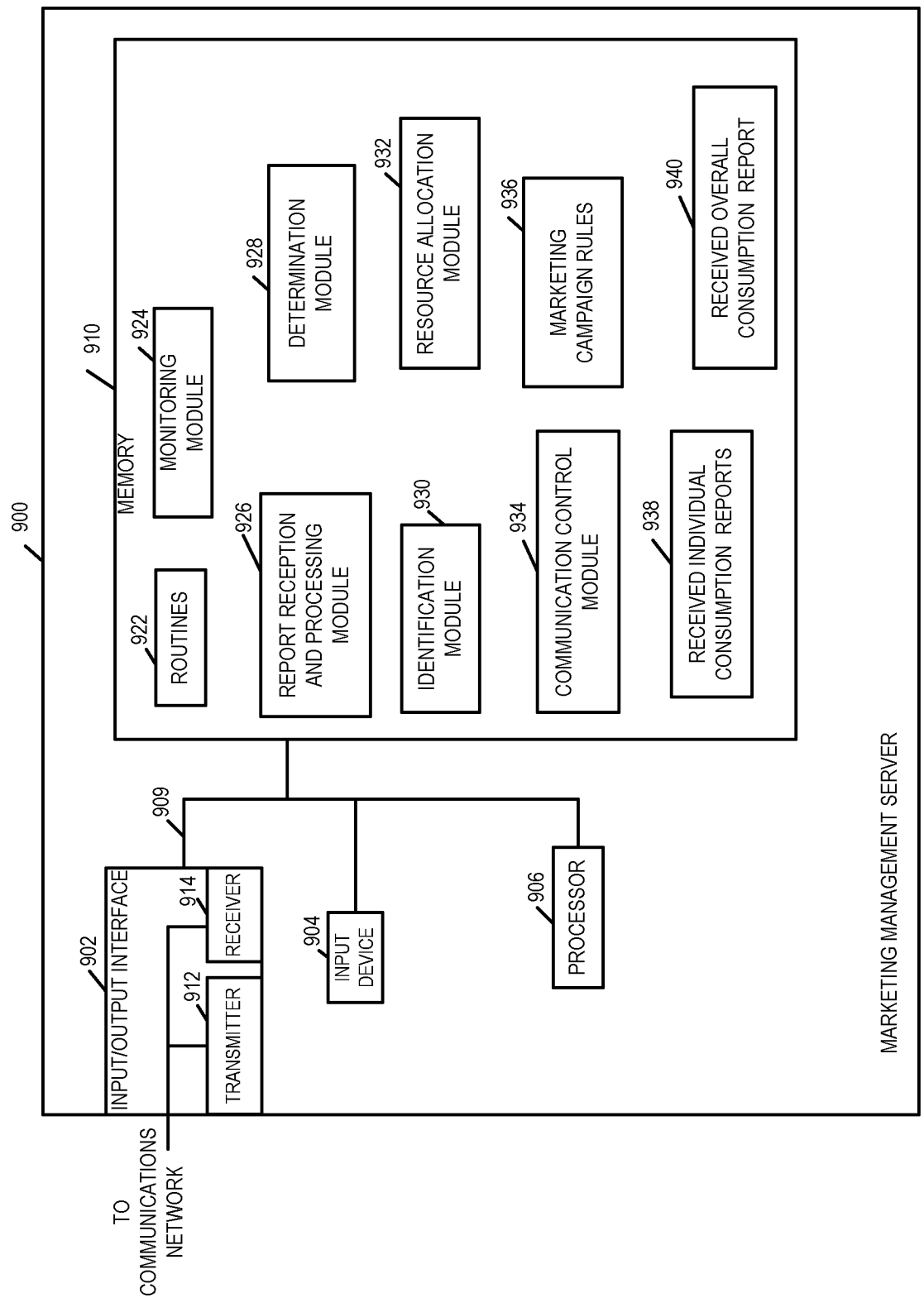
FIG. 9 illustrates an exemplary marketing management server implemented in accordance with an exemplary embodiment.

FIG. 9 illustrates an exemplary marketing management server 900 implemented in accordance with an exemplary embodiment. The exemplary marketing management server 900 can be, and in some embodiments is, used as the marketing management server 108 of FIG. 1. In some embodiments the marketing management server 900 is configured to implement at least some of the steps of the method of flowchart 300. In accordance with one aspect of some embodiments the exemplary marketing management server 900 is configured to receive and process consumption reports information from the audience measurement device 800, determine if a given advertisement/marketing campaign is performing optimally and if desired reallocate one or more advertisement resources in accordance with the invention.

As shown, the marketing management server 900 includes an input/output (I/O) interface 902, an input device 904, a processor 906, and a memory 910 coupled together via a bus 908. The various elements of the marketing management server 900 can exchange data and information over the bus 908.

The I/O interface 902 includes a transmitter 912 and a receiver 914. Via the I/O interface 902, the marketing management server 900 can exchange signals and/or information with other devices and/or system elements such as the servers in the network headend 102.

The input device 904 may be a keypad, touch screen, and/or other device for receiving and processing input commands/instructions. The processor 906, e.g., a CPU, executes control routines 922 and in some embodiments one or more modules to control the marketing management server 900 to operate in accordance with the invention and implement one or more steps of the method of flowchart 300. Thus to control the operation of marketing management server 900, the processor 906 uses information, various modules and/or routines including instructions stored in memory 910.

In addition to the routines 922, the memory 910 includes a monitoring module 924, a reception and processing module 926, a determination module 928, an identification module 930, a resource allocations module 932, a communications control module 934, marketing campaign rules 936, received individual consumption reports 938 and received overall consumption report 940.

Routines 922 include communications routines and/or device control routines. The monitoring module 924 is configured to monitor for consumption reports from one or more consumption tracking and measurement device such as the audience measurement device 800. The report reception and processing module 926 receives and processes consumption reports received from one or more devices via the interface 902. Monitoring and receipt of reports from individual consumption measurement devices, may occur on an ongoing basis. In various embodiments reception and processing module 926 analyzes the received consumption reports to determine further actions to be taken by one or more other modules of the marketing server 900.

The overall consumption report received by the marketing management server from the audience measurement device provides information on the number of unique customers which are reached via the overall marketing campaign as well as the number of customers reached via particular communications channels. The determination module 928 is configured to determine the success of a given marketing campaign based on a received corresponding consumption report. As part of this determination the determination module 928 is configured to compare, based on the information in a received consumption report, the number of unique customers reached by the marketing campaign for which the report is received to the target number of unique customers which were to be reached during the interval to which the received report corresponds as part of the marketing campaign. The determination module 928 performs a check to determine if the marketing goals are being satisfied or if a change in the allocation of marketing resources should be made. Based on the determination, the determination module 928 provides input to the resource allocation module 932 to take further action.

For example if it is determined that the number of unique customers reached is not less than the target number of customers, i.e., the marketing objectives in terms of unique customers to be reached is being satisfied, then the determination module provides an input to the resource allocation module 932 indicating that the no changes to the current advertisement resource allocation is recommended and current advertisement resource allocation should be maintained for the given marketing campaign. If it is determined that the marketing objectives are not being meet, e.g., the number of unique customers being reached is below the target number, the determination module 928 provides an input to the identification module 930 triggering the identification module 930 to identify, from the overall consumption report, different advertising channels corresponding to different content delivery platforms reaching, in the marketing campaign, same individual customers. This allows identification of overlapping advertising channels corresponding to different content delivery platforms. The determination module 928 further provides an input to the resource allocation module 932 recommending change in advertising resource allocation for the marketing campaign. The identification module 930 provides the information regarding the identified overlapping advertising channels to the resource allocation module 932.

Based on the received input from the determination module 928 and the identification module 930, the resource allocation module 932 decreases the advertisement resources allocated to one of the identified overlapping channels corresponding to a first content delivery platform. In some embodiments the resource allocation module 932 increases the advertisement resources allocated to another advertising channel corresponding to a second content delivery platform, e.g., an advertising channel with the least overlap, for better utilization of advertisement resources. It should be appreciated that the identification of overlapping advertising channels corresponding to different content delivery platforms allows the marketing management server 900 to determine how to shift or reallocate resources between different marketing channels to increase the number of unique customers reached using limited marketing resources, e.g., limited number of advertisements which can be served given marketing budget constraints.

The communications control module 934 controls marketing management server's communications with other devices in accordance with the invention. The communications control module 934 controls communication, e.g., via interface 902, of new advertisement resource allocation information to an advertisement server, e.g., server 164 of FIG. 1, to control allocation of advertisements to different platforms in accordance with new allocation of advertisement resources.

The marketing campaign rules 936 include information and/or guidelines for various marketing campaigns handled by the marketing management server 900. Each set of marketing campaign rules for a given campaign includes rules or guidelines for that particular marketing campaign. The guidelines include marketing objectives, preferred audience for the given campaign, a target number of unique audience, e.g., customers, to be reached, preferred geographic location and/or demographics of audience etc. Received individual consumption reports 938 and the overall consumption report 940 are stored in the server 900 following their receipt from the audience measurement device 800.

The content consumption tracking methods allow a service provider to extend the capability associated with an individual service, such as cable or IP based TV programming services, by integrating Internet data consumption, e.g., web browsing data reflected in the form of DNS requests and other consumption data, e.g., IP TV, cable network supplied VOD content, SDV content, etc, allowing analyses of consumption data and answers to questions like:

1) Do people that regularly visit these types of web sites also tend to view television in certain ways?
2) Do people who tend to watch certain programs tend to visit these types of web sites?
3) Do people who browse extensively tend to watch more or less TV in general?
4) Do people who consume video on IP based TV viewing, e.g., on a cell phone or pad device, tend to "replace" cable TV viewing or viewing of particular programs with viewing of IP TV consumption
5) Do people who watch certain kinds of programming on IP based TV tend to watch certain kinds of programming on their regular TV?

The results of such analysis can and in some embodiments are used to automatically control or alter a marketing campaign to reduce the risk of repeatedly presenting the same advertisements to the same users and/or with adjustments to amount of advertisements send over particular marketing channels to increase the chance of reaching a larger number of distinct potential customers or voters.

Numerous variations on the above described embodiments are possible.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a media content distribution system. Various embodiments are also directed to methods, e.g., a method of controlling the distribution of media content, e.g., video on demand audio and/or video content. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method. In some embodiments devices, elements and/or modules that are configured to perform various functions are implemented as circuits, e.g., with a different circuit for each function being implemented in some but not necessarily all embodiments.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., in circuitry, ASICs, ICs, etc. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A communications method comprising:
    detecting, at a DNS server, a first DNS request from a first device, said first device corresponding to a first customer, the first DNS request being a URL resolution request;
    communicating, from the DNS server, information about the first DNS request to an audience measurement device, said information including information corresponding to the first customer and information indicating a URL included in said first DNS request; and
    operating the audience measurement device to use information in a first customer record to correlate a first video request with the URL resolution request.

2. The method of claim 1, further comprising:
    storing customer records in a customer database, said customer records including the first customer record, said first customer record including device identification information indicating devices corresponding to the first customer to which the first customer record corresponds.

3. The method of claim 2, further comprising:
    operating the audience measurement device to receive, from a video control device, video request information, said video request information corresponding to said first video request including information corresponding to a second customer, said first video request being a request for video that was received by the video control device from a second device corresponding to the second customer, said second customer being the same or different from said first customer.

4. The method of claim 3,
    wherein the audience measurement device uses the information corresponding to the first customer and the information corresponding to the second customer along with the device information in the customer record corresponding to the first customer to determine that the first video request and the URL resolution request correspond to the same customer; and
    wherein the method further comprises:
    operating the audience measurement device to generate a per customer content consumption report including content consumption information relating to both web page accessed content and video on demand accessed content.

5. The method of claim 1,
    wherein said information corresponding to the first customer includes both an IP address allocated to a first content playback device used by the first customer and a MAC address associated with the first customer.

6. The method of claim 2,
    wherein the first DNS request and the first video request correspond to the first customer;
    wherein said information about the first DNS request includes a time, said time being a time the first DNS request was detected at the DNS server; and
    wherein the method further comprises:
    operating the audience management device to use the time the first DNS request was detected and information indicating a period of time during which a program is provided to the first customer to determine an order of content consumption events corresponding to the first customer; and
    operating the audience measurement device to generate a per customer content consumption report corresponding to the first customer including content consumption information relating to both accessed web page content and accessed video on demand content.

7. The method of claim 6, wherein said program is a program provided in accordance with a broadcast schedule and includes predetermined advertising content.

8. The method of claim 7, wherein said program is a switched digital video (SDV) program.

9. The method of claim 3, further comprising:
    operating the audience measurement device to generate an overall consumption report indicating at least a total number of customers reached across multiple content delivery platforms during a time period to which the report corresponds and information indicating the number of customers reached via each content delivery platform for which the overall consumption report provides information.

10. The method of claim 9, wherein the overall consumption report includes information indicating the overlap between customers being reached by at least two different content delivery platforms or communications channels.

11. The method of claim 10, further comprising:
communicating the overall consumption report to a management device; and operating the management device to automatically reallocate resources between different content delivery platforms based on information included in the overall consumption report to increase the number of unique customers being reached by a campaign.

12. The method of claim 11, wherein reallocating resources includes shifting resources from a first communication channel to a second communications channel, said first communication channel having been indicated to have customers being reached by said second communications channel as well as said first communications channel.

13. A communications system comprising:
a DNS server including a DNS request tracking module configured to detect a first DNS request from a first device, the first device corresponding to a first customer, the first DNS request being a URL resolution request;
an audience measurement device configured to receive DNS request information from the DNS request tracking module, said information including information about the first DNS request, said information including an identifier corresponding to the first customer and information indicating a URL included in said first DNS request; and
wherein the audience measurement device is further configured to receive, from a video control device, first video information about a first video request which is from a second device corresponding to a second customer, said second customer being the same or different from said first customer; and to use information in a first customer record to correlate the first video request with the URL resolution request.

14. The system of claim 13, further comprising:
a storage device including customer records, said customer records including the first customer record, said first customer record including device identification information indicating devices corresponding to the first customer to which the first customer record corresponds.

15. The system of claim 13,
wherein the audience measurement device is further configured to use the information corresponding to the first customer and the information corresponding to the second customer and the device information in the customer record corresponding to the first customer to determine that the first video and URL resolution request correspond to the same customer and to generate a per customer content consumption report including content consumption information relating to both web page accessed content and video on demand accessed content.

16. The system of claim 13, wherein said information corresponding to the first customer includes at least one of an IP address allocated to a first content playback device used by the first customer and a MAC address associated with the first customer.

17. The system of claim 13, wherein the audience measurement device is further configured to receive first video information including information indicating a program supplied to the second device.

18. The system of claim 17,
wherein said information about the first DNS request includes a time, said time being a time the first DNS request was detected at the DNS server;
wherein said first video information includes information indicating a period of time during which the program is provided to the first customer; and
wherein the audience management device is further configured to use the time the first DNS request was detected and the period of time during which the program is provided to the subscriber to determine the order of content consumption events corresponding to the first customer and to generate a per customer content consumption report corresponding to the first customer including content consumption information relating to both accessed web page content and accessed video on demand content.

19. The system of claim 17, wherein said program is a program provided in accordance with a broadcast schedule and includes predetermined advertising content.

20. The system of claim 18, further comprising;
a management device;
wherein the audience measurement device is further configured to communicate the overall consumption report to the management device; and
wherein the management device is configured to automatically change allocation of resources between different content delivery channels based on information included in the overall consumption report to increase the number of unique customers being reached by the campaign.

21. The method of claim 1, further comprising:
operating the DNS server to return an IP address corresponding to the URL included in said first DNS request to the first device in response to the first DNS request.

22. The method of claim 21, wherein the audience measurement device is a separate device from the first device.

23. The method of claim 21,
wherein the audience measurement device is a consumption tracking and correlation device located in a network headend; and
wherein the first device is a customer premises device located at a customer premises.

24. The method of claim 23, further comprising:
operating the audience measurement device to interpret the first DNS request as corresponding to a web site access operation;
identifying at least one of i) a customer premises or ii) a customer premises device corresponding to the first DNS request based on information in the first DNS request, said customer premises device being the first device; and
interpret a time of accessing the web site corresponding to the first DNS request by using a time of resolution of the first DNS request or a time at which the response to the resolution request is sent to the first device as the time of accessing the web site.

25. The method of claim 24, further comprising:
using the interpreted time of accessing the web site corresponding to the first DNS request to determine a user's exposure to advertisements.

* * * * *